United States Patent Office 3,006,892
Patented Oct. 31, 1961

3,006,892
EPOXIDE RESIN COMPOSITIONS
Otho Leroy Nikles, Phoenixville, Pa., assignor to Ciba Products Corporation, Phoenixville, Pa., a corporation of Delaware
No Drawing. Filed Jan. 27, 1959, Ser. No. 789,262
10 Claims. (Cl. 260—47)

This invention relates to epoxy resin compositions and a method for producing same. Epoxy resins are well known in the plastic art and are valuable in the manufacture of coatings, molding resins, adhesives, and the like. The present invention provides a method for producing epoxy resins which have excellent color, clarity and high adhesion properties. By means of applicant's novel process higher molecular weight 1,2-epoxy resins can readily be obtained from lower molecular weight epoxy resins, the higher molecular weight resins so produced, being readily reproducible, essentially linear in character, having relatively definite melting points, solvent solubility, and being curable to solid infusible products.

It has already been proposed to prepare high molecular weight epoxy resins by reacting an initial low molecular weight or melting point epoxy resin with a dihydric phenol. According to the prior art processes the initial low molecular weight epoxide resin is first produced by reacting a dihydric phenol such as bisphenol A (4,4'-dihydroxydiphenyldimethyl methane) with epichlorhydrin or glycerol dichlorhydrin in the presence of caustic alkali, then adding to the low molecular weight epoxy resin thus formed a dihydric phenol and effecting the reaction of dihydric phenol with the initial epoxy resin in the presence of an alkali metal hydroxide, like sodium hydroxide or a metal salt, like sodium acetate to form a higher melting point or higher molecular weight epoxy resin.

However, all attempts to effect this advancement of a low molecular weight epoxy resin to a high molecular weight resin in the presence of such alkaline catalysts have generally proven to be unsuccessful or erratic. This is due in part to the presence in most commercial resins of appreciable amounts of labile organic chlorine as chlorhydrin. Catalysts like sodium hydroxide or potassium hydroxide when used in catalytic quantities react with the labile chlorhydrin groups to form the corresponding sodium or potassium chlorides which are ineffective as catalysts. When comparatively larger quantities are used of either of these hydroxides, uncontrolled and erratic condensation and polymerization leading to branch formation occurs. When the alkali metal hydroxide is used in a quantity of 0.1 percent or more based on the weight of the reactants, gelation sets in immediately, and thermosetting, infusible and insoluble resins are obtained.

In the absence of catalysts the reaction is slow and even if carried out at high temperatures is generally incomplete. The products are dark in color and generally contain branched chain or undesired polymeric products.

It has now surprisingly been found that these disadvantages can be avoided when as the catalyst lithium hydroxide is used in a proportion of less than 60 parts per million (=0.006%) based on the weight of the dihydric phenol employed.

Accordingly, the invention provides a process for producing essentially linear 1,2-epoxy resins of higher molecular weight and higher melting point from low molecular weight low melting point 1,2-epoxy resins, which comprises reacting a low molecular weight 1,2-epoxy resin with a dihydric phenol in the presence of lithium hydroxide as catalyst, said lithium hydroxide being present in an amount of less than 0.006% based on the weight of the dihydric phenol.

The process of the invention yields higher molecular epoxy resins with a molecular weight approximately the same as a theoretical molecular weight of a linear epoxy resin calculated from the proportions of reactants used.

It has been found that this condensation can be carried out with good success also in the presence of inorganic salts, organic chlorine or chlorhydrin. The presence of inorganic salts effects the rate of reaction but has little effect on the degree of reaction.

Lower epoxy resins having molecular weights ranging from about 340 to above 1000 have been used in the reaction. It is preferred, however, to employ lower epoxy resins having molecular weights ranging from about 340 to 440, since these lower molecular weight resins are more easily obtained free from the salt and other by-products of manufacture. The lower the molecular weight the less resin has to be processed through the purification steps and this results in lower over-all costs. Depending on the ratio of dihydric phenol to the lower molecular weight epoxy resin employed, higher epoxy resins with molecular weights of from about 500 to 6000 (epoxy content of 4.0 to 0.4 epoxide equivalents/kg.) have been readily obtained.

Any low molecular weight 1,2-epoxy compound can be employed as the starting material. There may be used, for example, epoxidated diolefines, dienes or cyclic dienes, such as butadiene dioxide, 1:2:5:6-epoxide-hexane and 1:2:4:5-diepoxycyclohexane; epoxidated diolefinically unsaturated carboxylic acid esters, such as methyl-9:10:12:13-diepoxy-stearate; the dimethyl ester of 6:7:10:11-diepoxy-hexadecane-1:16 - dicarboxylic acid; epoxidated compounds containing two cyclohexenyl groups, such as diethylene glycol bis-(3:4-epoxy-cyclohexane carboxylate) and 3:4-epoxy-cyclohexylmethyl-3:4-epoxy-cyclohexane carboxylate. There may also be mentioned such as are obtainable by reacting a dicarboxylic acid with epichlorhydrin or dichlorhydrin in the presence of an alkali. Such polyesters may be derived from aliphatic dicarboxylic acids, such as oxalic acid, succinic acid, glutaric acid, adipic acid, pimelic acid, suberic acid, azelaic acid, sebacic acid and especially from aromatic dicarboxylic acids, such as phthalic acid, isophthalic acid, terephthalic acid, 2:6-naphthylene-dicarboxylic acid, diphenyl-ortho:ortho'-dicarboxylic acid, ethylene glycol bis-(para-carboxyphenyl)-ether or the like. There may be mentioned, for example, diglycidyl adipate and diglycidyl phthalate. There are preferably used diglycidyl esters which substantially correspond to the formula

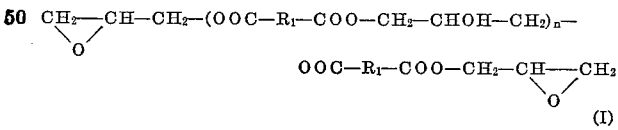

(I)

in which $R_1$ represents an aromatic hydrocarbon radical, and $n$ has the average value zero to 2.

There may also be used polyethers containing two epoxide groups such as are obtainable by etherifying a dihydric alcohol or diphenol with epichlorhydrin or dichlorhydrin in the presence of an alkali. These compounds may be derived from glycols, such as ethylene glycol, diethylene glycol, triethylene glycol, propylene glycol-(1:2)-, propylene glycol-(1:3), butylene glycol-(1:4), pentane-1:5-diol, hexane-1:6-diol and especially from diphenols, such as resorcinol, pyrocatechol, hydroquinone, 1:4-dioxynaphthalene, bis-(4-hydroxyphenyl)-methane, bis-(4-hydroxy-phenyl)-methyl-phenyl-methane, bis-(4-hydroxyphenyl)-tolyl-methane, 4:4' - dihydroxydiphenyl, bis-(4-hydroxyphenyl)-sulfone and especially 2:2-bis-(4-hydroxyphenyl)-propane. There may be mentioned ethylene glycol diglycidyl ether and resorcinol diglycidyl ether. There are preferably used diglycidyl ethers which substantially correspond to the formula

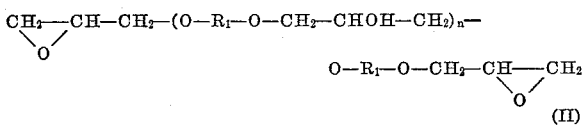
(II)

in which $R_1$ and $n$ have the meanings given for Formula I.

Especially useful as starting compounds are diglycidyl ethers which substantially correspond to the formula

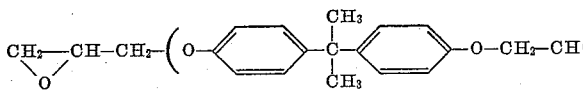
(III)

in which $n$ has the average value zero to 2, and more especially zero to 0.5.

As dihydric phenols which are used in the instant process there may be mentioned resorcinol, pyrocatechol, hydroquinone, 1:4-dihydroxy-naphthalene, bis-(4-hydroxyphenyl)-methane, bis-(4-hydroxyphenyl)-methyl-phenyl-methane, bis-(4-hydroxyphenyl)-tolyl-methane, 4:4'-dihydroxy-diphenyl, bis - (4-hydroxyphenyl)-sulfone and especially bisphenol A.

Thus, bisorthocresol diglycidyl ether can readily be condensed with bisorthocresol or bisphenol A by the new process. Likewise, bisphenol A diglycidyl ether can be condensed with bisorthocresol. Because of their ready availability, the process is especially applicable to the conversion of low molecular weight 1,2-epoxy resins or polyglycidyl ethers obtained from bisphenol A and epichlorhydrin to higher molecular weight epoxy resins with bisphenol A.

It has been found, however, that in general all kinds of 1:2-epoxy resins of lower molecular weight can be converted into essentially linear epoxy resins of higher molecular weight when they are reacted with dihydric phenols in the presence of trace amounts of lithium hydroxide.

The amount of lithium compound must be extremely small and must be less than 60 p.p.m. based on the dihydric phenol used. The practical range is approximately from 5 to 50, preferably from 30 to 45 parts per million based on the dihydric phenol.

The temperature at which the reaction is carried out may be varied since the temperature affects only the reaction rate until the hydroxyl groups of the dihydric phenol are consumed. In general, a temperature ranging from about 160° to 195° C. depending on the melting point and viscosity of the final resin being prepared is preferred. At temperatures under 150° C. the reaction is at a considerably reduced rate.

Thus, applicant's process employing lithium hydroxide in the prescribed amount permits condensation without branch formation. When, for example, 43-44 parts of lithium hydroxide monohydrate per million parts of bisphenol A are used in the condensation of a diglycidyl ether of bisphenol A (Epoxy value of 5.3 moles/kg.) and bisphenol A at a temperature of 160-165° C., the reaction proceeds smoothly forming a linear epoxy resin of high molecular weight. The rate of condensation is directly proportional to the temperature. To insure the production of a linear polymer and at the same time to provide completion of the reaction within a short time, it is desirable to carry out the reaction at a high temperature and then control it by dropping the temperature just prior to the consumption of the dihydric phenol. A feature of the invention is that the reaction can be carried out with reactants which can be of commercial grade and need not be absolutely pure, for example, free from organic and inorganic chlorides. Thus, commercial or technical grades of the epoxy resins such as polyglycidyl ethers of bisphenol A, and of the dihydric phenols, such as bisphenol A, can be employed.

The amount of dihydric phenol employed in proportion to the epoxy resin employed dictates the degree of polymerization or condensation obtained. In general, less than one hydroxyl equivalent of the dihydric phenol per epoxide equivalent of the epoxide resin is used.

The following examples will serve to illustrate the invention, the parts being by weight:

*Example 1*

2000 parts of an epoxy resin made by reacting epichlorhydrin with bisphenol A (bis-(4-hydroxyphenyl)-dimethyl-methane) in the usual manner and having an epoxy content of 5.2–5.3 epoxide equivalents/kg. and a molecular weight of 385 are mixed with 565 parts of bisphenol A and 0.025 part of lithium hydroxide monohydrate. The mixture is heated to a temperature of 170–175° C. and is maintained at this temperature for about two hours. The temperature is then lowered to 140–145° C. in 20 minutes and maintained at this temperature for one hour. The resin is then poured rapidly into trays and allowed to cool. The resin has the following properties:

| | |
|---|---|
| Molecular weight | 800–900. |
| Melting point (Durran) | 68° C. |
| Epoxide content | 2.18 epoxide equivalents/kg. |
| Viscosity at 130° C | 1040 cps. |
| Color (Gardner) | 1–2. |

*Example 2*

2000 parts of the epoxy resin employed in Example 1, 600 parts of bisphenol A and 0.026 part of lithium hydroxide monohydrate were reacted in the same manner as in Example 1. A resin having the following properties was obtained:

| | |
|---|---|
| Molecular weight | 900–1050. |
| Melting point (Durran) | 73° C. |
| Epoxide content | 2.03 epoxide equivalents/kg. |
| Viscosity at 130° C | 1400 cps. |
| Color (Gardner) | 1–2. |

*Example 3*

When 2000 parts of the epoxy resin described in Example 1, 750 parts of bisphenol A and 0.035 part of lithium hydroxide monohydrate were reacted in the same manner as in Example 1, a resin having the following properties was obtained:

| | |
|---|---|
| Molecular weight | 1200–1600. |
| Melting point (Durran) | 89.0° C. |
| Epoxide content | 1.37 epoxide equivalents/kg. |

*Example 4*

To 2230 parts of the resin described in Example 1 there were added 950 parts of bisphenol A and 0.041 part of lithium hydroxide monohydrate. The temperature was maintained at 180–185° C. for two hours and then lowered in 20 minutes to 140–145° C. and maintained at the latter temperature for one hour. The resin was then poured into trays and allowed to cool. It has the following properties:

| | |
|---|---|
| Molecular weight | 1600–2000. |
| Melting point (Durran) | 97.5° C. |
| Epoxide content | 1.035 epoxide equivalents/kg. |
| Color (Gardner) | 1–2. |

Example 5

To 2255 parts of the epoxide resin described in Example 1 there were added 1150 parts of bisphenol A and 0.05 part of lithium hydroxide monohydrate. The temperature was maintained at 190–195° C. for two hours and then lowered in 20 minutes to 150–155° C. and held at this temperature for one hour. The resin was then poured into trays and allowed to cool. It has the following properties:

Molecular weight_____ 3000–4000.
Melting point (Durran)__ 115.8° C.
Epoxide content_____ 0.526 epoxide equivalents/kg.
Color (Gardner)_____ 1–2.

Example 6

To 2255 parts of the epoxide resin described in Example 1 were added 1175 parts of bisphenol A and 0.052 part of lithium hydroxide monohydrate. The procedure was the same as in Example 5. The resulting resin has the following properties:

Molecular weight_____ 4000–5000.
Melting point (Durran) 126° C.
Epoxide content_____ 0.44 epoxide equivalents/kg.
Color (Gardner)_____ 1–2.

Example 7

2180 parts of an epoxy resin prepared from epichlorhydrin and bisphenol A in the usual manner and having an epoxy value of 4.8 epoxide equivalents/kg., a chlorhydrin value of 0.2 moles/kg., and a molecular weight of about 420 were mixed with 565 parts of bisphenol A and 0.025 part of lithium hydroxide monohydrate and heated to 170–175° C. The mixture was maintained at the temperature for two hours, then cooled over 20 minutes to 140–145° C. and held at the latter temperature for one hour after which the epoxy resin was poured into trays and cooled. The properties of the resin thus obtained were as follows:

Molecular weight_____ 800–900.
Epoxide content_____ 2.20 epoxide equivalents/kg.
Color (Gardner)_____ 1–2.

Example 8

2000 parts of an epoxy resin prepared from epichlorhydrin and bisorthocresol in the usual manner and having an epoxy value of 4.95 epoxide equivalents/kg., and a molecular weight of 400–410 were mixed with 820 parts of bisorthocresol and 0.025 part of lithium hydroxide monohydrate and heated to 180–185° C. The mixture was maintained at the temperature for 5 hours, then cooled over 20 minutes to 140–155° C. and held at the latter temperature for one hour after which the resin was poured into trays and cooled. The properties of the resin thus obtained were as follows:

Molecular weight_____ 1500–1700.
Melting point (Durran)___ 86° C.
Epoxide content_____ 1.28 epoxide equivalents/kg.
Color (Gardner)_____ 6–7.

The higher molecular weight epoxy resins obtained by the novel process herein described are useful in the manufacture of varnishes, molding resins, adhesives, fibers, and the like. They can be cured or hardened with the conventional hardening and curing agents employed in the epoxy resin arts into infusible and insoluble products. The usual amines and polycarboxylic anhydrides can be employed for this purpose.

What is claimed is:

1. A process for producing essentially linear 1,2-epoxy resins of higher molecular weight and higher melting point from low molecular weight low melting point 1,2-epoxy resins having a molecular weight of about 340 to about 1000, which comprises reacting a low molecular weight 1,2-epoxy resin with a dihydric phenol in admixture with lithium hydroxide as catalyst, said lithium hydroxide being present in effective amount of less than 0.006% based on the weight of the dihydric phenol.

2. A process in accordance with claim 1, wherein the low molecular weight 1,2-epoxy resin is a polyglycidyl ether of a dihydric phenol.

3. A process in accordance with claim 1, wherein the low molecular weight 1,2-epoxy resin is a polyglycidyl ether of bis-(4-hydroxyphenyl)-dimethylmethane and the dihydric phenol is bis-(4-hydroxyphenyl)-dimethylmethane.

4. A process in accordance with claim 1, wherein there is used a proportion of the dihydric phenol to epoxide resin which is less than that corresponding to the epoxide equivalent of the low molecular weight 1,2-epoxy resin.

5. A process in accordance with claim 1, wherein the lithium hydroxide is employed in the range of 5 to 50 parts per million based on the weight of the dihydric phenol employed.

6. A process in accordance with claim 1, wherein the lithium hydroxide is used in the form of lithium hydroxide monohydrate.

7. A process in accordance with claim 1, wherein the reactants are heated to a temperature of from about 160° C. to 195° C. until the hydroxyl groups of the dihydric phenol are substantially consumed.

8. A process in accordance with claim 1, wherein the reactants are heated to a temperature from about 160° to 195° C. until shortly before the hydroxyl groups of the dihydric phenol are consumed, and subsequently the reaction is completed at a lower temperature.

9. A composition capable on heating of forming high molecular weight, substantially linear 1,2-epoxy resins, said composition consisting of a low molecular weight 1,2-epoxy resin having a molecular weight of about 340 to about 1000, a dihydric phenol, and lithium hydroxide, said lithium hydroxide being present in an effective amount of less than 0.006% based on the weight of the dihydric phenol.

10. A composition in accordance with claim 9, wherein the lithium hydroxide is present in the amount of 5 to 50 parts per million based on the weight of the dihydric phenol.

References Cited in the file of this patent

UNITED STATES PATENTS 2,615,008   Greenlee _____ Oct. 21, 1952